(12) United States Patent
Takahashi et al.

(10) Patent No.: US 9,113,378 B2
(45) Date of Patent: Aug. 18, 2015

(54) MOBILE COMMUNICATION METHOD AND RADIO BASE STATION

(75) Inventors: Hideaki Takahashi, Tokyo (JP); Anil Umesh, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 118 days.

(21) Appl. No.: 14/000,146

(22) PCT Filed: Feb. 14, 2012

(86) PCT No.: PCT/JP2012/053365
§ 371 (c)(1),
(2), (4) Date: Aug. 16, 2013

(87) PCT Pub. No.: WO2012/111654
PCT Pub. Date: Aug. 23, 2012

(65) Prior Publication Data
US 2013/0322409 A1    Dec. 5, 2013

(30) Foreign Application Priority Data
Feb. 18, 2011   (JP) .................................. 2011-033796

(51) Int. Cl.
*H04W 36/08* (2009.01)
*H04W 88/08* (2009.01)
*H04W 92/20* (2009.01)
*H04W 36/00* (2009.01)

(52) U.S. Cl.
CPC .......... *H04W 36/0055* (2013.01); *H04W 88/08* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2010/0303039 A1* | 12/2010 | Zhang et al. | 370/331 |
| 2011/0134774 A1* | 6/2011 | Pelletier et al. | 370/252 |
| 2011/0190011 A1* | 8/2011 | Choi et al. | 455/466 |
| 2012/0002643 A1* | 1/2012 | Chung et al. | 370/331 |
| 2012/0046066 A1* | 2/2012 | Tamura et al. | 455/525 |
| 2012/0082137 A1 | 4/2012 | Ito | |
| 2012/0087273 A1* | 4/2012 | Koo et al. | 370/252 |
| 2013/0153298 A1* | 6/2013 | Pietraski et al. | 175/45 |

FOREIGN PATENT DOCUMENTS

| | | |
|---|---|---|
| WO | 2009/149665 A1 | 12/2009 |
| WO | 2010/113490 A1 | 10/2010 |
| WO | 2010/146673 A1 | 12/2010 |

OTHER PUBLICATIONS

Office Action for corresponding Japanese Application No. 2011-033796, mailed Sep. 3, 2013 (5 pages).

(Continued)

*Primary Examiner* — Ayaz Sheikh
*Assistant Examiner* — Tarell Hampton
(74) *Attorney, Agent, or Firm* — Osha Liang LLP

(57) ABSTRACT

A mobile communication method according to the present invention includes a process of transmitting information regarding a PCell#1 and a Scell#1 connected by a mobile station UE in control of a radio base station eNB#2 to a radio base station eNB#3 from the radio base station eNB#2 when the mobile station UE that is performing CA communication executes handover from the control of the radio base station eNB#2 to the control of a radio base station eNB#3 in at least one of an uplink or a downlink.

4 Claims, 6 Drawing Sheets

(56) References Cited

OTHER PUBLICATIONS

NEC; "Further discussion on information provided to target"; 3GPP TSG RAN2 Meeting #71, R2-104665; Madrid, Spain; Aug. 23-27, 2010 (3 pages).
International Search Report for corresponding International Application No. PCT/JP2012/053365, mailed Apr. 10, 2012 (4 pages).
Written Opinion for corresponding International Application No. PCT/JP2012/053365, mailed Apr. 10, 2012 (4 pages).
3GPP TS 36.300 V10.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Sep. 2011 (194 pages).
3GPP TS 36.423 V10.3.0; "3rd Generation Partnership Project: Technical Specification Group Radio Access Network; Evolved Universal Terrestrial Radio Access Network (E-UTRAN); X2 application protocol (X2AP); (Release 10)"; Sep. 2011 (132 pages).
3GPP TS 36413 V10.0.1; "3rd Generation Partnership Project; Technical Specification Group Radio Access Network; Evolved Universal Terrestrial Radio Access Network (E-UTRAN); S1 Application Protocol (S1AP) (Release 10)"; Jan. 2011 (15 pages).
3GPP TS 36.413 V10.3.0; "3rd Generation Partnership Project; Technical Specification Group Radio Access Network; Evolved Universal Terrestrial Radio Access Network (E-UTRAN); S1 Application Protocol (S1AP) (Release 10)"; Sep. 2011 (255 pages).

* cited by examiner

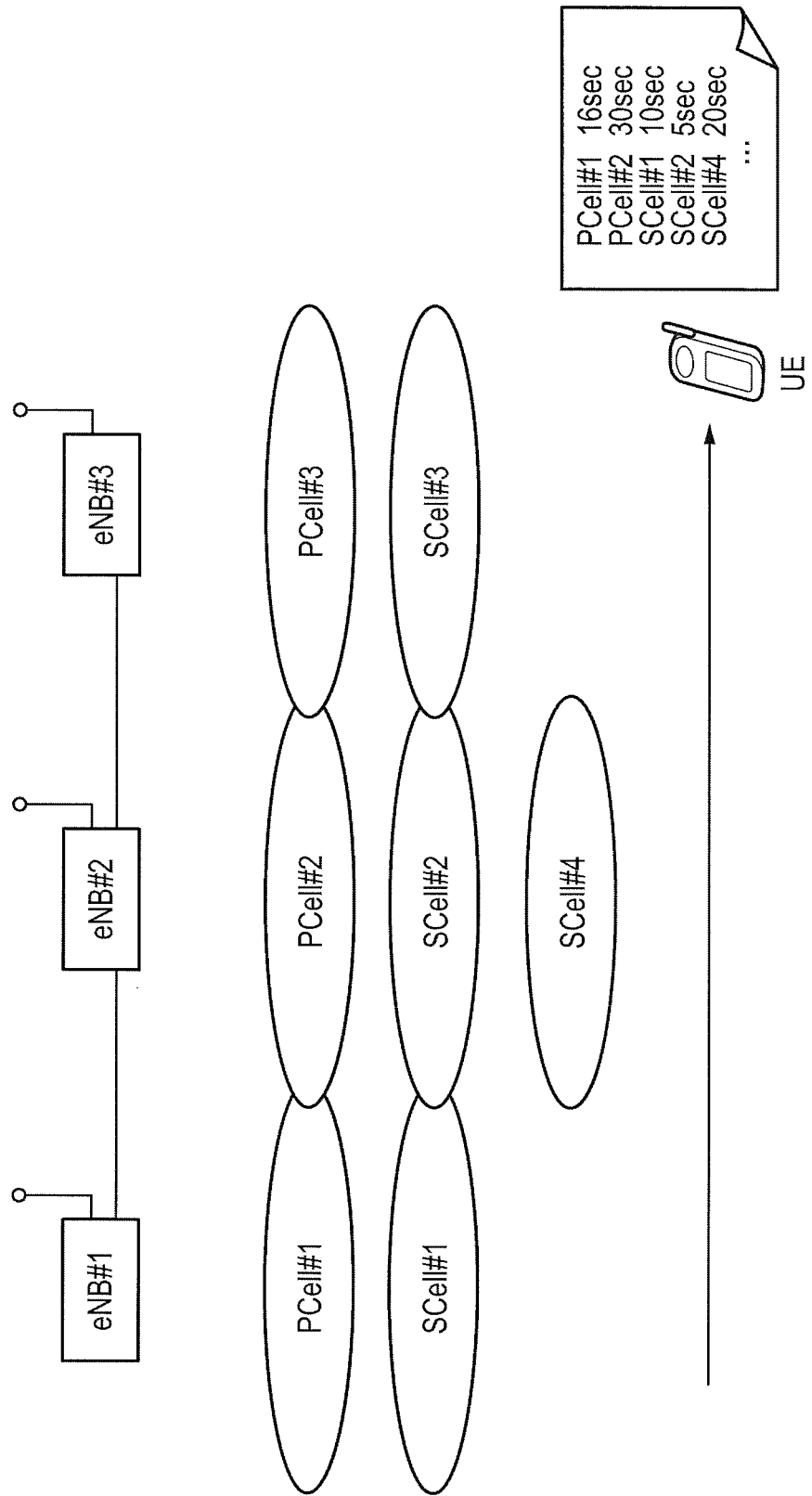

FIG. 2

9.2.1.42 UE History Information
The UE History Information IE contains information about cells that a UE has been served by in active state prior to the target cell.

(a)

| IE/Group Name | Presence | Range | IE type and reference | Semantics description | Criticality | Assigned Criticality |
|---|---|---|---|---|---|---|
| Last Visited Cell List | | 1 to <MaxNrOfCells> | | Most recent information is added to the top of this list | - | - |
| >Last Visited Cell Information | M | | 9.2.1.43 | | | - |

9.2.1.43 Last Visited Cell Information
The Last Visited Cell Information may ntain E-UTRAN or UTRAN cell specific information.

(b)

| IE/Group Name | Presence | Range | IE type and reference | Semantics description | Criticality | Assigned Criticality |
|---|---|---|---|---|---|---|
| CHOICE Last Visited Cell Information | M | | | | - | - |
| >E-UTRAN Cell | | | | | | |
| >>Last Visited E-UTRAN Cell Information | | | 9.2.1.43a | | | - |
| >UTRAN Cell | | | | | | |
| >>Last Visited UTRAN Cell Information | | | OCTET STRING | Defined in [19] | | - |
| >GERANCell | | | | | | |
| >>Last Visited GERAN Cell Information | | | 9.2.1.43b | | | - |

9.2.1.43a Last Visited E-UTRAN Cell Information
The Last Visited E-UTRAN Cell Information contains information about a cell that is to be used for RRM purposes.

(c)

| IE/Group Name | Presence | Range | IE type and reference | Semantics description | Criticality | Assigned Criticality |
|---|---|---|---|---|---|---|
| Global Cell ID | M | | E-UTRAN CGI 9.2.1.38 | | - | - |
| Cell Type | M | | 9.2.1.66 | | | |
| Time UE stayed in Cell | | | INTEGER (0..4095) | The duration of the time the UE stayed in the cell in seconds. If the UE stays in a cell more than 4095s, this IE is set to 4095 | | |

FIG. 3

9.2.1.38  E-UTRAN CGI

This information element is used to globally identify a cell (see [2]).

| IE/Group Name | Presence | Range | IE type and reference | Semantics description |
|---|---|---|---|---|
| PLMN Identity | M | | 9.2.3.8 | |
| Cell Identity | M | | BIT STRING (28) | The leftmost bits of the Cell Identity correspond to the eNB ID (defined in section 9.2.1.37). |

(a)

9.2.1.66  Cell Type

The cell type provides the cell coverage area.

| IE/Group Name | Presence | Range | IE type and reference | Semantics description | Criticality | Assigned Criticality |
|---|---|---|---|---|---|---|
| Cell Size | M | | ENUMERATED (verysmall, small, medium, large, ....) | | - | - |

9.2.1.43a    Last Visited E-UTRAN Cell Information
The Last Visited E-UTRAN Cell Information contains information about a cell that is to be used for RRM purposes.

| IE/Group Name | Presence | Range | IE type and reference | Semantics description | Criticality | Assigned Criticality |
|---|---|---|---|---|---|---|
| Global Cell ID | M | | E-UTRAN CGI 9.2.1.38 9.2.1.66 | | – | |
| Cell Type | M | | | | – | |
| Time UE stayed in Cell | M | | INTEGER (0..4095) | The duration of the time the UE stayed in the cell in seconds. If the UE stays in a cell more than 4095s, this IE is set to 4095 | | |
| Last VisitedSCell List | | 1 to <MaxNrOfSCells> | | | | |
| > Global Cell ID | O | | GLOBAL CELL ID OF SCELL | | | |
| > CellType | O | | CELL TYPE OF SCELL (LARGE, MEDIUM, SMALL, AND THE LIKE) IS INDICATED SAME AS 9.2.1.66 DEFINITION. | | | |
| > Configured or Activated time | O | | CONFIGURED TIME BY RRC OR CONFIGURED AND ACTIVATED TIME BY RRC. | | | |

FIG. 5

9.2.1.43a Last Visited E-UTRAN Cell Information
The Last Visited E-UTRAN Cell Information contains information about a cell that is to be used for RRM purposes.

| IE/Group Name | Presence | Range | IE type and reference | Semantics description | Criticality | Assigned Criticality |
|---|---|---|---|---|---|---|
| Global Cell ID | M | | E-UTRAN CGI 9.2.1.38 | | - | |
| Cell Type | M | | 9.2.1.66 | | - | |
| Time UE stayed in Cell | M | | INTEGER (0..4095) | The duration of the time the UE stayed in the cell in seconds. If the UE stays in a cell more than 4095s, this IE is set to 4095 | | |
| Carrier Aggregation Cell Type | O | | ENUMERATED (PCell, SCell, ....) | | | |

MOBILE COMMUNICATION METHOD AND RADIO BASE STATION

TECHNICAL FIELD

The present invention relates to a mobile communication method and a radio base station.

BACKGROUND ART

In the long term evolution (LTE) system, it is configured such that, when a mobile station UE executes handover from under control of a first radio base station eNB to under control of a second radio base station eNB, the first radio base station eNB transmits "UE history information" to the second radio base station eNB in the handover procedure (for example, in an S1/X2 handover procedure).

To be specific, as illustrated in FIG. 6, is configured such that, when the mobile station UE executes handover from under the control of the radio base station eNB#2 to under control of a radio base station eNB#3, the radio base station eNB#2 transmits the "UE history information" to the radio base station eNB#3 in the handover procedure.

Here, the "UE history information" is history information regarding a serving cell in "RRC_CONNECTED" of the mobile station UE.

In the example of FIG. 6, the "UE history information" includes information indicating connection was maintained for 16 seconds in a cell #1, information indicating connection was maintained for 30 seconds in a cell #2, and the like.

For example, the "UE history information" is used to select a candidate of a handover destination cell in the second radio base station eNB.

CITATION LIST

Non-Patent Literatures

Non-Patent Literature 1: 3GPP TS36.300
Non-Patent Literature 2: 3GPP TS36.413
Non-Patent Literature 3: 3GPP TS36.423

SUMMARY OF INVENTION

Technical Problem

In the LTE-Advanced system, the mobile station UE is configured to perform carrier aggregation (CA) communication between the mobile station UE and the radio base station eNB using a plurality of component carriers (CC) having different carrier frequencies, that is, one primary CC (PCC) and one or a plurality of secondary CCs (SCCs) in at least one of an uplink or a downlink.

The mobile station UE that is performing the CA communication is configured to connect to a Pcell that is a serving cell in the PCC.

In addition, the mobile station UE that is performing the CA communication is configured to set a Scell that is a serving cell in the SCC when connecting to the Pcell.

Here, the mobile station UE that is performing the CA communication is configured to connect to the Scell by activating the set Scell (activation).

However, in the conventional LTE system, when the mobile station UE that is performing the CA communication executes handover from under the control of the first radio base station eNB to under the control of the second radio base station eNB, there is a problem that the first radio base station eNB cannot determine which cell's history information is to be transmitted to the second radio base station eNB as the "UE history information" in the handover procedure.

Therefore, the present invention has been made in view of the above problem, and an objective of the present invention is to provide a mobile communication method and a radio base station capable of transmitting history information regarding an effective cell as "UE history information" in a handover procedure of a mobile station UE that is performing CA communication.

Solution to Problem

A first feature of the present invention is a mobile communication method including: when a mobile station performing communication using a primary carrier and a sub-carrier having different carrier frequencies in at least one of an uplink and a downlink executes handover from under control of a first radio base station to under control of a second radio base station, a step of transmitting, from the first radio base station to the second radio base station, information regarding a serving cell of the primary carrier and a serving cell of the sub-carrier to which the mobile station was connected under the control of the first radio base station.

A second feature of the present invention is a radio base station including: when a mobile station performing communication using a primary carrier and a sub-carrier having different carrier frequencies in at least one of an uplink or a downlink executes handover from under control of the radio base station to under control of another radio base station, a transmission unit configured to transmit, to the another radio base station, information regarding a serving cell of the primary carrier and a serving cell of the sub-carrier to which the mobile station was connected under the control of the radio base station.

Advantageous Effects of Invention

As described above, according to the present invention, a mobile communication method and a radio base station can be provided, which are capable of transmitting history information regarding an effective cell as "UE history information" in a handover procedure of a mobile station UE that is performing CA communication.

BRIEF DESCRIPTION OF DRAWINGS

FIG. 1 is a diagram for describing a mobile communication system according to a first embodiment of the present invention.

FIG. 2 is a diagram illustrating an example of an information element of "UE History Information" used in the mobile communication system according to the first embodiment of the present invention.

FIG. 3 is a diagram illustrating an example of the information element of the "UE History Information" used in the mobile communication system according to the first embodiment of the present invention.

FIG. 4 is a diagram illustrating an example of the information element of the "UE History Information" used in the mobile communication system according to the first embodiment of the present invention.

FIG. 5 is a diagram illustrating an example of the information element of the "UE History Information" used in the mobile communication system according to the first embodiment of the present invention.

Figure 6:
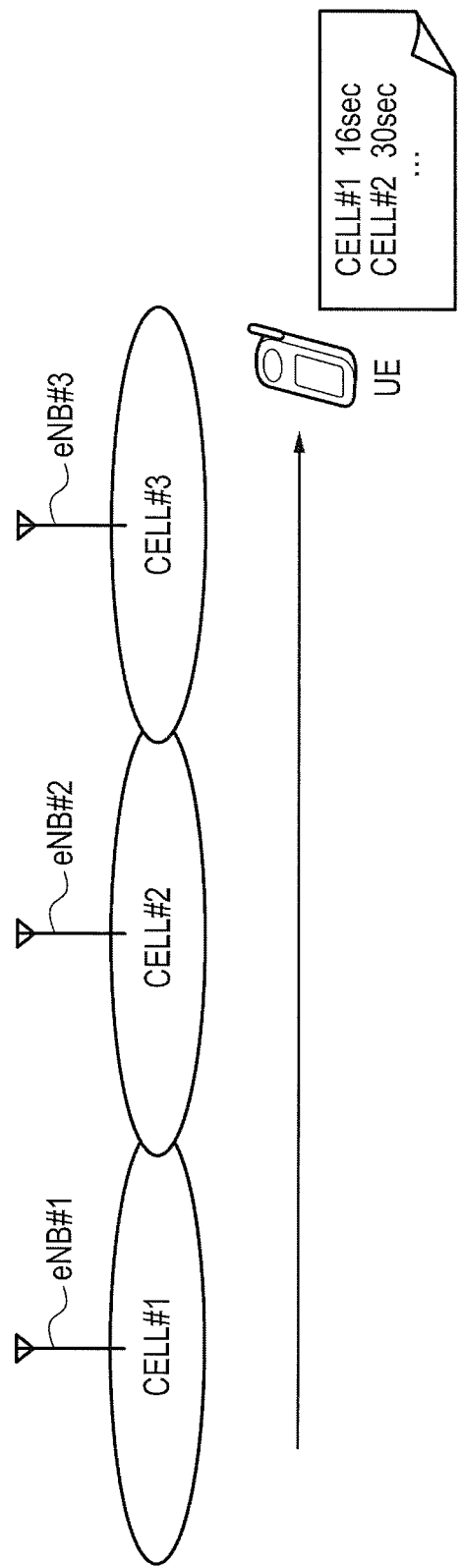
FIG. 6 is a diagram for describing a conventional mobile communication system.

DESCRIPTION OF EMBODIMENTS (A Mobile Communication System According to a First Embodiment of the Present Invention)

A mobile communication system according to a first embodiment of the present invention will be described with reference to FIGS. 1 and 6.

The mobile communication system according to the present embodiment is a mobile communication system of the LTE-Advanced system, and a mobile station UE is configured to be able to perform CA communication using a plurality of CCs having different carrier frequencies in a mobile communication system according to the present embodiment.

For example, in the example of FIG. 1, the mobile station UE is configured to execute handover from a first state of performing the CA communication using a Pcell#1 and a Scell#1 under the control of the radio base station eNB#1 to a second state of performing the CA communication using a Pcell#2 and a Scell#2/#4 under the control of the radio base station eNB#2, and then, to execute handover from the second state to a third state of performing the CA communication using a Pcell#3 and a Scell#3 under the control of the radio base station eNB#3.

First, when the mobile station UE executes handover from the first state to the second state, a transmission unit of the radio base station eNB#1 is configured to transmit the "UE History Information" to the radio base station eNB#2 through an S1/X2 interface in the handover procedure (for example, in the S1/X2 handover procedure).

To be specific, the transmission unit of the radio base station eNB#1 is configured to transmit information regarding the PCell#1 and the Scell#1 to which the mobile station UE was connected under the control of the radio base station eNB#1 to the radio base station eNB#2 with the "UE History Information".

For example, the transmission unit of the radio base station eNB#1 is configured to transmit a "Cell ID" of the Pcell#1 as the information regarding the Pcell#1 and a "Cell ID" of the Scell#1 as the information of the SCell#1 to the radio base station eNB#2 with the "UE History Information".

In addition, the transmission unit of the radio base station eNB#1 may be configured to transmit a duration of time in which the mobile station UE was connected in the Pcell#1 as the information of the Pcell#1, and to transmit a duration of time in which the mobile station US configured the Scell#1 by radio resource control (RRC) as the information regarding the Scell#1 to the radio base station eNB#2 with the "UE History Information"

In addition, the transmission unit of the radio base station eNB#1 may be configured to transmit a duration of time in which the mobile station UE was connected in the Pcell#1 as the information regarding the Pcell#1, and to transmit a duration of time in which the mobile station UE configured and activated the Scell#1 by RRC as the information regarding the Scell#1 to the radio base station eNB#2 with the "UE History Information".

Existing information elements of the "UE History Information" defined in TS36.413 or in TS36.423 of 3GPP are illustrated in FIGS. 2 and 3.

For example, the transmission unit of the radio base station eNB#1 may be configured to transmit, to the radio base station eNB#2, the "Cell ID" of the Pcell#1 with an information element "Global Cell ID" of information element "Last Visited E-UTRAN Cell Information" of the existing "UE History Information", and to transmit a duration of time in which the mobile station UE was connected in the Pcell#1 with an information element "Time UE stayed in Cell" of the information element "Last Visited E-UTRAN Cell Information".

Further, the transmission unit of the radio base station eNB#1 may be configured to transmit, to the radio base station eNB#2, as illustrated in FIG. 4, the "Cell ID" of the Scell#1 with an information element "Global Cell ID" of a new information element "Last VisitedSCell List" added to the information element "Last Visited E-UTRAN Cell Information" of the existing "UE History Information", and to transmit a duration of time in which the mobile station UE configured the Scell#1 by the RRC with an information element "Configured or Actived time" of the information element "Last VisitedSCell List".

Here, the transmission unit of the radio base station eNB#1 may be configured to transmit, to the radio base station eNB#2, a duration of time in which the mobile station UE configured and activated the Scell#1 by the RRC with the information element "Configured or Actived time" of the information element "Last VisitedSCell List".

Alternatively, as illustrated in FIG. 5, the transmission unit of the radio base station eNB#1 may be configured to transmit, to the radio base station eNB#2, the "Cell ID" of the Pcell#1 with the information element "Global Cell ID" by configuring an information element "Carrier Aggregation Cell Type" newly added to the information element "Last Visited E-UTRAN Cell Information" of the existing "UE History Information" to the "Pcell", and to transmit a duration of time in which the mobile station UE was connected in the Pcell#1 with the information element "Time UE stayed in Cell".

Further, as illustrated in FIG. 5, the transmission unit of the radio base station eNB#1 may be configured to transmit, to the radio base station eNB#2, the "Cell ID" of the Scell#1 with the information element "Global Cell ID" by configuring the information element "Carrier Aggregation Cell Type" to the "Scell", and to transmit a duration of time in which the mobile station UE configured the Scell#1 by the RRC with the information element "Time UE stayed in Cell".

Here, the transmission unit of the radio base station eNB#1 may be configured to transmit the "Cell ID" of the Scell#1 with the information element "Global Cell ID" by configuring the information element "Carrier Aggregation Cell Type" to the "Scell", and to transmit a duration of time in which the mobile station UE configured and activated the Scell#1 by the RRC by the information element "Time UE stayed in Cell" to the radio base station eNB#2.

In the example of FIG. 1, the transmission unit of the radio base station eNB#1 transmits information indicating connection was maintained for 16 seconds in the Pcell#1, information indicating a duration of time in which the Scell#1 was configured by the RRC for 30 seconds (or information indicating the Scell#1 was configured and activated by the RRC for 30 seconds) and the like to the radio base station eNB#2 as the "UE history information".

Second, when the mobile station UE executes handover from the second state to the third state, a transmission unit of the radio base station eNB#2 is configured to transmit the "UE History Information" to the radio base station eNB#3 through the S1/X2 interface in the handover procedure (for example, in the S1/X2 handover procedure).

To be specific, the transmission unit of the radio base station eNB#2 is configured to transmit information regarding PCell#2 and the Scell#2/#4 to which the mobile station UE was connected under the control of the radio base station eNB#2 to the radio base station eNB#3 with the "UE History Information".

For example, the transmission unit of the radio base station eNB#2 is configured to transmit the "Cell ID" of the Pcell#2 as the information regarding the Pcell#2 and the "Cell ID" of the SCell#2/#4 as the information regarding the Scell#2/#4 to the radio base station eNB#3 with the "UE History Information".

In addition, the transmission unit of the radio base station eNB#2 may be configured to transmit a duration of time in which the mobile station UE was connected in the Pcell#2 as the information regarding the Pcell#2, and to transmit a duration of time in which the mobile station UE configured the Scell#2/#4 by the RRC as the information regarding the Scell#2/#4 to the radio base station eNB#3 with the "UE History Information".

In addition, the transmission unit of the radio base station eNB#2 may be configured to transmit a duration of time in which the mobile station UE was connected in the Pcell#2 as the information regarding the Pcell#2, and to transmit a duration of time in which the mobile station UE configured the Scell#2/#4 by the RRC as the information regarding the Scell#2/#4 to the radio base station eNB#3 with the "UE History Information".

Here, the transmission unit of the radio base station eNB#2 may be configured to transmit information regarding the PCell#1 and the Scell#1 to which the mobile station UE was connected under the control of the radio base station eNB#2 to the radio base station eNB#3 with the "UE History Information" illustrated in FIGS. 2 to 5, similarly to the transmission unit of the radio base station eNB#1.

In addition, the transmission unit of the radio base station eNB#2 may be configured to transmit information regarding the PCell#1 and the Scell#1 to which the mobile station UE was connected under the control of the radio base station eNB#1 in addition to the information regarding the PCell#2 and the Scell#2/#4 to which the mobile station UE was connected under the control of the radio base station eNB#2 to the radio base station eNB#3 with the "UE History Information".

That is, the transmission unit of the radio base station eNB#2 is configured to transmit the information regarding the PCell and the Scell to which the mobile station UE was connected during a predetermined period to the radio base station eNB#3.

In the example of FIG. 1, the transmission unit of the radio base station eNB#2 transmits, to the radio base station eNB#3, the information indicating connection was maintained for 16 seconds in the Pcell#1, the information indicating the Scell#1 was configured for 30 seconds by the RRC (or the information indicating the Scell#1 was configured and activated for 30 seconds by the RRC), the information indicating connection was maintained for 30 seconds in the Pcell#2, the information indicating the Scell#2 was configured for 5 seconds by the RRC (or the information indicating the Scell#2 was configured and activated for 5 seconds by the RRC), the information indicating the Scell#4 was configured for 20 seconds by the RRC (or the information indicating the Scell#4 was configured and activated for 20 seconds by the RRC), and the like, as the "UE history information.

According to the mobile communication system of the first embodiment of the present invention, the radio base station eNB gets to know the number of Scells that the mobile station UE configured in the past in neighboring radio base stations eNB with the "UE history information".

In addition, since the radio base station eNB knows the maximum number of configurable Scells as the access stratum (AS) capability of the mobile station UE, the radio base station eNB can hand over the mobile station UE to radio base stations eNB in which the maximum number of configurable Scells have been configured based on the number of configurable Scells and the number of Scells configured in the neighboring radio base stations eNB.

In addition, according to the mobile communication system of the first embodiment of the present invention, the radio base station eNB gets to know which cell has been configured by which mobile station UE as the Pcell in the neighboring radio base stations eNB with the "UE history information" from a plurality of mobile stations UE.

As a result, the radio base station eNB can consider load balance when selecting a handover destination radio base station eNB in the handover procedure.

Note that the features of the present embodiments described above may be expressed in the following manner.

A first feature of the present embodiment is a mobile communication method, including, when a mobile station UE performing CA communication using a PCC (primary carrier) and a SCC (sub-carrier) having different frequencies in at least one of an uplink or a downlink executes handover from under control of a radio base station eNB#1 (first radio base station) to under a radio base station eNB#2 (second radio base station), a step of transmitting, from the radio base station eNB#1 to the radio base station eNB#2, information regarding a PCell#1 (a serving cell of the primary carrier) and a Scell#1 (a serving cell of the sub-carrier) to which the mobile station UE was connected under the control of the radio base station eNB#1.

In the first feature of the present embodiment, in the above-described method, the radio base station eNB#1 may transmit, to the radio base station eNB#2, a duration of time in which the mobile station UE configured the Pcell#1 as the information regarding the Pcell#1, and a duration of time in which the mobile station UE configured the Scell#1 as the information regarding the Scell#1.

In the first feature of the present embodiment, in the above-described method, the radio base station eNB#1 may transmit, to the radio base station eNB#2, a duration of time in which the mobile station UE was connected in the Pcell#1 as the information regarding the Pcell#1, and a duration of time in which the mobile station UE configured and activated the Scell#1 as the information regarding the Scell#1.

A second feature of the present embodiment is a radio base station eNB#1, which includes, when a mobile station UE performing CA communication using a PCC and SCC having different frequencies in at least one of an uplink and a downlink executes handover from under control of the radio base station eNB#1 to under control of a radio base station eNB#2, a transmission unit configured to transmit, radio base station eNB#2, information regarding a PCell#1 and a Scell#1 to which the mobile station UE connected under the control of the radio base station eNB#1.

In the second feature of the present embodiment, the transmission unit may be configured to transmit, radio base station eNB#2, a duration of time in which the mobile station UE was connected in the Pcell#1 as the information regarding the Pcell#1, and a duration of time in which the mobile station UE configured the Scell#1 as the information regarding the Scell#1.

In the second feature of the present embodiment, the transmission unit may be configured to transmit, to the radio base station eNB#2, a duration of time in which the mobile station UE was connected in the Pcell#1 as the information regarding the Pcell#1, and a duration of time in which the mobile station UE configured and activated Scell#1 as the information regarding the Scell#1.

Note that the operation of the radio base station eNB and the mobile station UE may be implemented by hardware, may be implemented by a software module executed by a processor, or may be implemented by combination of the hardware and the software module.

The software module may be provided in a storage medium in an arbitrary format, such as a random access memory (RAM), a flash memory, a read only memory (ROM), an erasable programmable ROM (EPROM), an electronically erasable and programmable ROM (EEPROM), a register, a hard disk, a removable disk, or a CD-ROM.

The storage medium is connected to a processor so that the processor can read/write information to/from the storage medium. Further, the storage medium may be integrated in the processor. Further, the storage medium and the processor may be provided in an ASIC. The ASIC may be provided in the radio base station eNB and the mobile station UE. Alternatively, the storage medium and the processor may be provided in the radio base station eNB and the mobile station UE as discrete components.

As described above, the present invention has been described in details using the above-described embodiments. However, it will be apparent to a person skilled in the art that the present invention is not limited to the embodiments described in the present specification. The present invention can be implemented as modifications and alternations without departing from the gist and scope of the present invention determined by the description of claims. Therefore, the description of the present specification is intended for exemplary illustration, and has no limitative meaning to the present invention.

Reference Signs List eNB#1, eNB#2, and eNB#3 Radio base station
UE Mobile station

The invention claimed is:

1. A mobile communication method comprising:
   when a mobile station performing communication using a primary carrier and a sub-carrier having different carrier frequencies in at least one of an uplink and a downlink executes handover from under control of a first radio base station to under control of a second radio base station,
   a step of transmitting, from the first radio base station to the second radio base station, information regarding a serving cell of the primary carrier and a serving cell of the sub-carrier to which the mobile station was connected under the control of the first radio base station, wherein
   in the step of transmitting, the first radio base station transmits, to the second radio base station, a duration of time in which the mobile station was connected in the serving cell of the primary carrier as the information regarding the serving cell of the primary carrier, and a duration of time in which the mobile station configured and activated the serving cell of the sub-carrier as the information regarding the serving cell of the sub-carrier.

2. The mobile communication method according to claim 1, wherein,
   in the step, the first radio base station transmits, to the second radio base station, a duration of time in which the mobile station was connected in the serving cell of the primary carrier as the information regarding the serving cell of the primary carrier, and a duration of time in which the mobile station configured the serving cell of the sub-carrier as the information regarding the serving cell of the sub-carrier.

3. A radio base station, comprising:
   when a mobile station performing communication using a primary carrier and a sub-carrier having different carrier frequencies in at least one of an uplink or a downlink executes handover from under control of the radio base station to under control of another radio base station,
   a transmission unit configured to transmit, to the another radio based station, information regarding a serving cell of the primary carrier and a serving cell of the sub-carrier to which the mobile station was connected under the control of the radio base station, wherein
   the transmission unit is configured to transmit, to the another radio base station, a duration of time in which the mobile station was connected in the serving cell of the primary carrier as the information regarding the serving cell of the primary carrier, and a duration of time in which the mobile station configured and activated the serving cell of the sub-carrier as the information regarding the serving cell of the sub-carrier.

4. The radio base station according to claim 3, wherein
   the transmission unit is configured to transmit, to the another radio base station, a duration of time in which the mobile station was connected in the serving cell of the primary carrier as the information regarding the serving cell of the primary carrier, and a duration of time in which the mobile station configured the serving cell of the sub-carrier as the information regarding the serving cell of the sub-carrier.

* * * * *